US012718104B2

(12) United States Patent
Soomro et al.

(10) Patent No.: US 12,718,104 B2
(45) Date of Patent: Aug. 25, 2026

(54) PLATFORM DETECTION

(71) Applicant: CHEP Technology Pty Limited, Sydney (AU)

(72) Inventors: Khurram Soomro, Orlando, FL (US); Francisco Jesus Hidalgo Romero, Fuenlabrada (ES); Jose Manuel Argibay Cañas, Fuenlabrada (ES)

(73) Assignee: CHEP Technology Pty Limited, Sydney (AU)

( * ) Notice: Subject to any disclaimer, the term of this patent is extended or adjusted under 35 U.S.C. 154(b) by 0 days.

(21) Appl. No.: 17/998,821

(22) PCT Filed: May 18, 2021

(86) PCT No.: PCT/AU2021/050461
§ 371 (c)(1),
(2) Date: Nov. 15, 2022

(87) PCT Pub. No.: WO2021/232092
PCT Pub. Date: Nov. 25, 2021

(65) Prior Publication Data
US 2023/0211382 A1 Jul. 6, 2023

(30) Foreign Application Priority Data
May 18, 2020 (EP) .................................... 20382420

(51) Int. Cl.
*B07C 5/34* (2006.01)
*B07C 5/342* (2006.01)
(Continued)

(52) U.S. Cl.
CPC ........... *G06N 3/084* (2013.01); *B07C 5/3404* (2013.01); *B07C 5/3422* (2013.01); *G06Q 10/083* (2013.01); *G06V 20/00* (2022.01)

(58) Field of Classification Search
CPC .. B07C 5/3404; B07C 5/3422; G06Q 10/083; G06N 3/084; G06V 20/00
See application file for complete search history.

(56) References Cited

U.S. PATENT DOCUMENTS 4,743,154 A * 5/1988 James .................. B23P 19/041 29/721
5,388,682 A 2/1995 Dudley
(Continued)

FOREIGN PATENT DOCUMENTS

CN 210253145 U 4/2020
DE 102011115359 A1 4/2013
(Continued)

OTHER PUBLICATIONS

PalletSortingSystems—Pallet Sorting Systems B.V—Herman de Haan Group The Netherlands uploaded May 22, 2019 URL: https://www.youtube.com/watch?v=Uyt4CEPEmrc.
(Continued)

*Primary Examiner* — Joseph C Rodriguez
(74) *Attorney, Agent, or Firm* — Alston & Bird LLP

(57) ABSTRACT

There is provided a computer implemented method comprising obtaining image data representing a platform, processing the image data using an algorithm, the algorithm configured to determine a property of the platform, obtaining, from the algorithm, data indicating a property of the platform and determining, based on the data indicating the property of the platform, a location to which the platform is to be transported.

18 Claims, 7 Drawing Sheets

(51) Int. Cl.

| | |
|---|---|
| ***G06N 3/084*** | (2023.01) |
| ***G06Q 10/083*** | (2023.01) |
| ***G06V 20/00*** | (2022.01) |

(56) References Cited

U.S. PATENT DOCUMENTS

| | | | | |
|---|---|---|---|---|
| 6,705,523 | B1 * | 3/2004 | Stamm | G06Q 10/08 235/383 |
| 7,150,598 | B2 * | 12/2006 | Smets | B65G 59/08 414/754 |
| 7,650,690 | B2 * | 1/2010 | Trembley | B65G 57/302 29/784 |
| 8,918,976 | B2 * | 12/2014 | Townsend | G06T 7/0004 29/772 |
| 8,960,244 | B1 * | 2/2015 | Aylsworth | B65G 59/02 144/245.5 |
| 9,120,630 | B1 * | 9/2015 | Hilgendorf | B65G 65/23 |
| 9,478,030 | B1 | 10/2016 | Lecky | |
| 10,099,391 | B2 * | 10/2018 | Hance | G05B 19/124 |
| 12,444,035 | B2 * | 10/2025 | Soomro | G06V 10/776 |
| 2018/0322362 | A1 | 11/2018 | Souder | |
| 2019/0389057 | A1 | 12/2019 | Chae | |
| 2021/0097636 | A1 | 4/2021 | Oobori et al. | |
| 2023/0114085 | A1 * | 4/2023 | Soomro | B65G 43/08 382/159 |
| 2023/0331486 | A1 * | 10/2023 | Eckman | G05B 13/0265 700/218 |

FOREIGN PATENT DOCUMENTS

| | | | |
|---|---|---|---|
| EP | 3374138 | 9/2018 | |
| EP | 3572996 | 11/2019 | |
| JP | 2009-042193 A | 2/2009 | |
| JP | 2018-066717 A | 4/2018 | |
| JP | 6676198 B1 | 4/2020 | |
| WO | WO 03093800 A1 | 11/2003 | |
| WO | WO-2005058717 A1 * | 6/2005 | B23P 19/041 |
| WO | WO2018022264 | 2/2018 | |
| WO | WO2018186234 | 10/2018 | |
| WO | WO 2021/221177 A1 | 11/2021 | |

OTHER PUBLICATIONS

Holz et al "A skill-based system for object perception and manipulation for automating kitting tasks" 2015 IEEE 20th Conference on Emerging, Technologies & Factory Automation (ETFA) IEEE: Sep. 8, 2015 (Sep. 8, 2015). pp. 1-9.

International Search Report and Written Opinion for International Application No. PCT/AU2021/050461, dated Jul. 9, 2021, (13 pages), Australian Patent Office, Woden ACT, Australia.

Youtube, "Pallet Sorting Systems." Pallet Sorting Systems B.V.—The Herman de Haan Group, The Netherlands (2:29 minutes), Uploaded: Jan. 12, 2023, (2 pages), <URL: https://www.youtube.com/watch?v=Uyt4CEPEmrc>.

Extended European Search Report for European Application No. 21809358.1, dated Sep. 19, 2024, 6 pages.

Japanese Office Action for Application No. 2022-570333, dated Jun. 3, 2025, 13 pages.

Chinese Office Action for Application No. 202180035141.5, dated Jul. 29, 2025, 14 pages.

Chinese Office Action for Application No. 202180035141.5, dated Apr. 18, 2026, 16 pages.

* cited by examiner

PLATFORM DETECTION

TECHNICAL FIELD OF THE INVENTION

The present invention relates to automatically recognising and sorting platforms, such as pallets, and in particular to determining locations for platforms based on classifying the platforms.

BACKGROUND

Platforms such as pallets and containers for distributing goods from location to location are well known. Such distribution may be, for example, between a factory, port, warehouse and retailer. FIGS. 1*a* and 1*b* show images of typical pallets 3. The pallet 3 has an upper surface 3*a* and a lower surface 3*b* (sometimes referred to as an upper and lower deck). Each of the upper surface 3*a* and lower surface 3*b* comprise planks of wood arranged adjacent to one another. The upper surface 3*a* is configured to support goods to be transported, and the lower surface 3*b* is configured to support the pallet 3 on a surface such as a floor or conveyer. The upper surface 3*a* is typically connected to the lower surface 3*b* by multiple blocks 3*c* which are also typically made of wood.

There may also be connector boards or bearers in between the blocks and upper or lower surfaces 3*a*, 3*b*. The blocks 3*c* are typically fixed to the upper surface 3*a* and lower surface 3*b* by fixing elements, such as nails or screws. That is, nails may be driven through, for example, the upper and lower surfaces 3*a*, 3*b* and into the blocks 3*c* so as to fix the upper and lower surfaces 3*a*, 3*b* and blocks 3*c* together. In other examples, pallets made of plastic may be integrally formed as a single unit.

When the goods have been removed from the platforms, the empty platforms are collected such that they can be reused. However, given that platforms come in a number of different makes, sizes and configurations, it is often necessary to sort the empty platforms into their respective groups. Additionally, it is often required to sort the platforms into groups for onward travel, where the groups are to be distributed to different destinations. This may occur if the platforms need to be returned to the owners of the platforms, for example.

The sorting referred to above may typically be carried out at a platform sorting facility, for example at a service centre, or may be carried out at a customer's site. The sorting plant may receive a number of unsorted pallets, for example, and will manually sort the pallets into desired groups. For example, half pallet sizes may be sorted into a different groups from full pallet sizes. Pallets may also be sorted by owner for return to the owner, or for onward distribution to a location specified by the owner.

It is an object of some embodiments of the present invention to alleviate one or more problems associated with the prior art.

SUMMARY

According to a first aspect of the invention there is provide a computer implemented method, the method comprising, obtaining image data representing a platform, processing the image data using an algorithm, the algorithm configured to determine a property of the platform based on one or more features of the platform, obtaining, from the algorithm, data indicating a property of the platform, and determining, based on the data indicating the property of the platform, a location to which the platform is to be transported.

The platform may comprise a pallet, dolly or container.

Processing the image data using the algorithm may comprise executing the algorithm on one or more processors to determine a property of the platform. The one or more features of the platform may be intrinsic features of the platform, such as the colour, material and/or shape of the platform.

The location may be a location in which the platform is to be stacked, such as the location of a stacker in a platform sorting facility. The location may be one of a plurality of locations, each location being associated with a particular property of the platform. In this way, platforms may be sorted into groups having the same or similar properties.

The method may further comprise outputting data indicative of the determined location.

Outputting the data indicative of the determined location may comprise outputting a control signal to an actuator, the actuator configured to actuate so as to cause the platform to be transported towards the determined location and actuating the actuator, based on the control signal, so as to cause the platform to be transported towards the determined location.

The actuator may be part of a path selector mechanism. Actuation of the actuator may change the path the platform takes. For example, actuation of the actuator may cause the platform to be diverted along a specific path, which may be different from an original path taken by the platform.

The method may further comprise selecting, based on the determined location, the actuator from a plurality of actuators. For example, multiple actuators may each be configured to direct the platform to multiple locations respectively. In this way, a determination is then made such that the selected actuator is one that will direct the platform to the desired location.

The method may further comprise advancing the platform, using a conveyor means, along a first path from an initial location, wherein actuating the actuator causes the platform to advance along a second path towards the determined location.

The conveyor means may comprise any suitable means for transporting platforms. For example, the conveyor means may comprise a conveyor belt which is advanced under the action of one or more motors. Alternatively, the conveyor means may comprise a plurality of rollers arranged perpendicular to the direction of travel of the platforms. The rollers may be free to rotate (or may rotate under the action of one or more motors) such that a platform may be pushed or pulled along the rollers to advance the platform. The conveyor means may comprise one or more tracks on which the platform may be guided along a path. The conveyor means may comprise a combination of different types of conveyor means, such as rollers and tracks, etc.

The actuator may be configured to act at a junction between the first path and the second path. In other examples, the actuator may be configure to act at a junction between three or more paths.

The method may further comprise capturing, using one or more cameras, one or more images of the platform, and obtaining the image data representing the platform from the one or more images of the platform.

For example, one or more images may be taken, the images comprising at least a portion of the platform. These images may be used to obtain the image data. That is, the image data may comprise the one or more images.

The algorithm may comprise a machine learned model trained to classify one or more features of the platform, and the data indicating a property of the platform may comprise data indicating a classification of the platform.

Using a machine learned model allows the model to learn the one or more features of the platform. In this way, the machine learned model is able to distinguish, or recognise, different platforms. For example, the machine learned model may have been trained to classify the manufacturer and/or model of the platform. The classification can then be used to determine the location to which the platform is to be sent, for example such that the same platforms are grouped together at different locations. The machine learned model may provide any suitable output which can be used for classification. For example, the machine learned model may output, for each category, a score (e.g. between 0 and 1) which represents a likelihood that a platform represented in the image data belongs to a particular category.

The algorithm may comprises a neural network. For example, a deep neural network such as a convolutional neural network may be used.

The machine learned model may be trained using image data captured from the one or more cameras. Additionally, the orientation of the cameras with respect to the platforms when generating the training data may be approximately the same as when taking images during the sorting of the platforms (e.g. not during training). In this way, image data used to train the algorithm is obtained from the same source and in the same orientation as the image data used during live settings, e.g. non training settings, leading to more robust classifications.

According to a second aspect of the invention there is provide a system comprising, one or more processors, and a memory storing an algorithm, the algorithm, which when executed by the one or more processors, is configured to determine a property of a platform based on one or more features of the platform. The one or more processors are configured to obtain image data representing a platform, process the image data using the algorithm, obtain, from the algorithm, data indicating a property of the platform, and determine a location to which the platform is to be transported based on the data indicating a property of the platform.

5 The one or more processors may comprise one or more CPUs and one or more GPUs.

The one or more processors may further be configured to output data indicative of the determined location.

10 The system may further comprise an actuator, wherein the output data indicative of the determined location is a control signal, and wherein the actuator is configured to receive the control signal, and further configured to actuate, based on the control signal, so as to cause the platform to be transported towards the determined location.

15 The one or more processors may be further configured to select, based on the determined location, the actuator from a plurality of actuators.

The system may further comprise a conveyor means configured to advance the platform along a first path from an initial location, wherein actuating the actuator causes the platform to advance along a second path towards the determined location.

The system may further comprise one or more cameras, the one or more cameras configured to capture one or more images of the platform, and wherein the one or more processors are further configured to obtain the image data representing the platform from the one or more images of the platform.

According to a third aspect of the invention there is provide a non-transitory computer readable medium comprising computer readable instructions which, when executed by one or more processors, cause the one or more processors to carry out the method 30 described above.

It will be appreciated that features described in the context of one aspect may be combined with other aspects of the invention.

BRIEF DESCRIPTION OF DRAWINGS

Embodiments of the invention will now be described, by way of example, with reference to the accompanying drawings, in which.

DETAILED DESCRIPTION

Figure 1A:
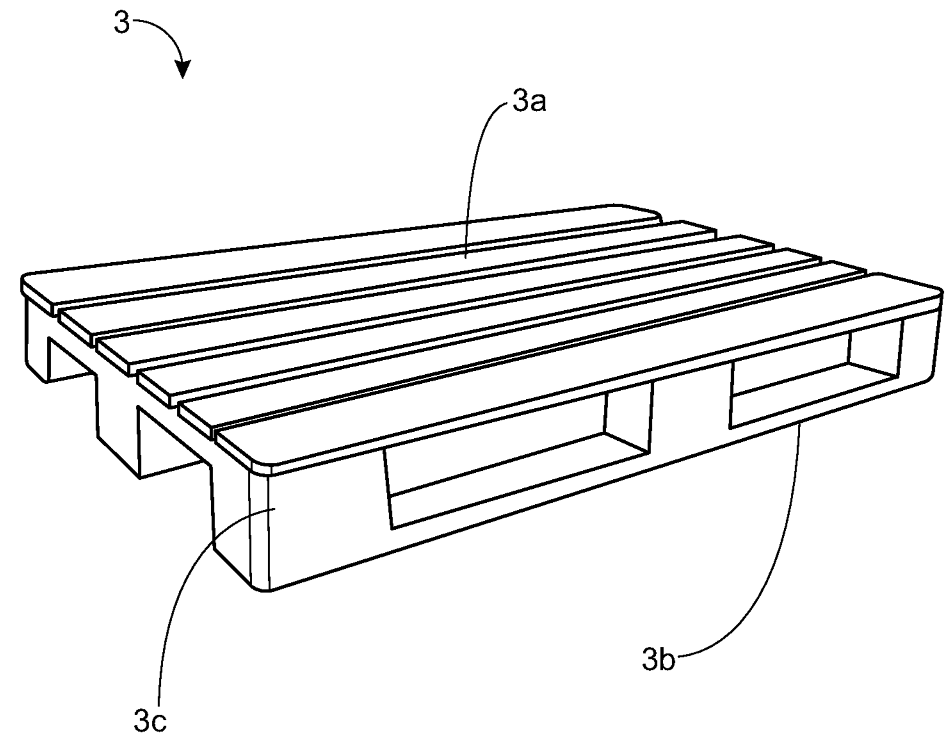
FIG. 1*a* shows a perspective view of a pallet.
Figure 1B:
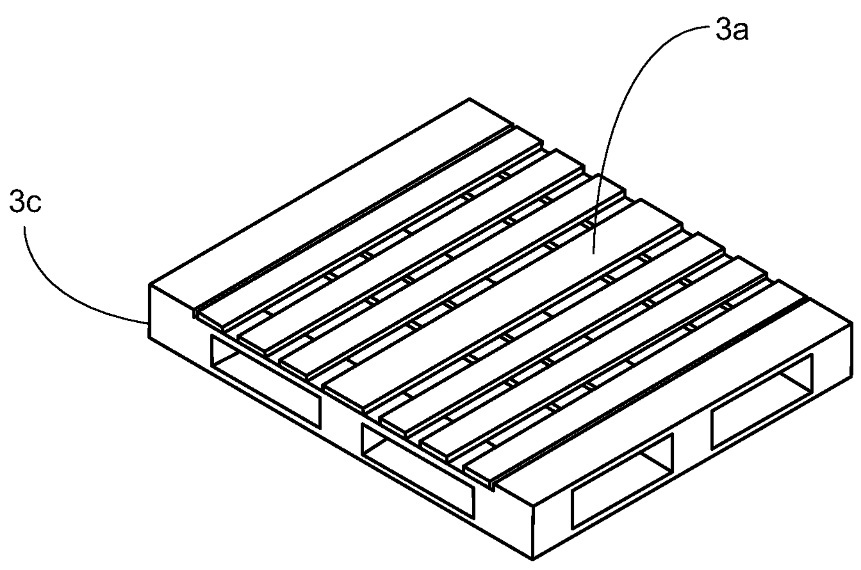
FIG. 1*b* shows a perspective view of a pallet.
Figure 2:
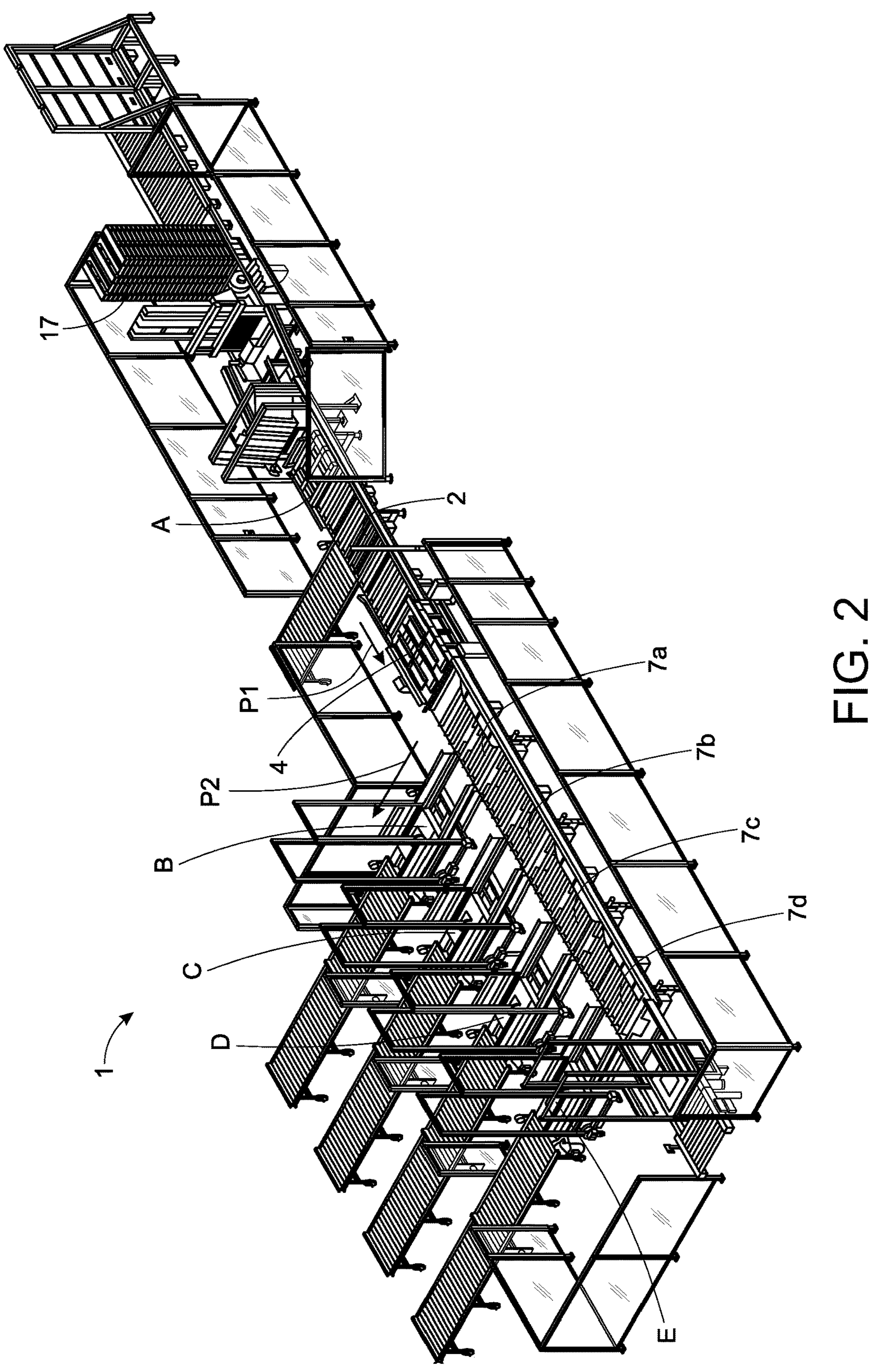
FIG. 2 shows a perspective view of a platform sorting facility.
Figure 3:
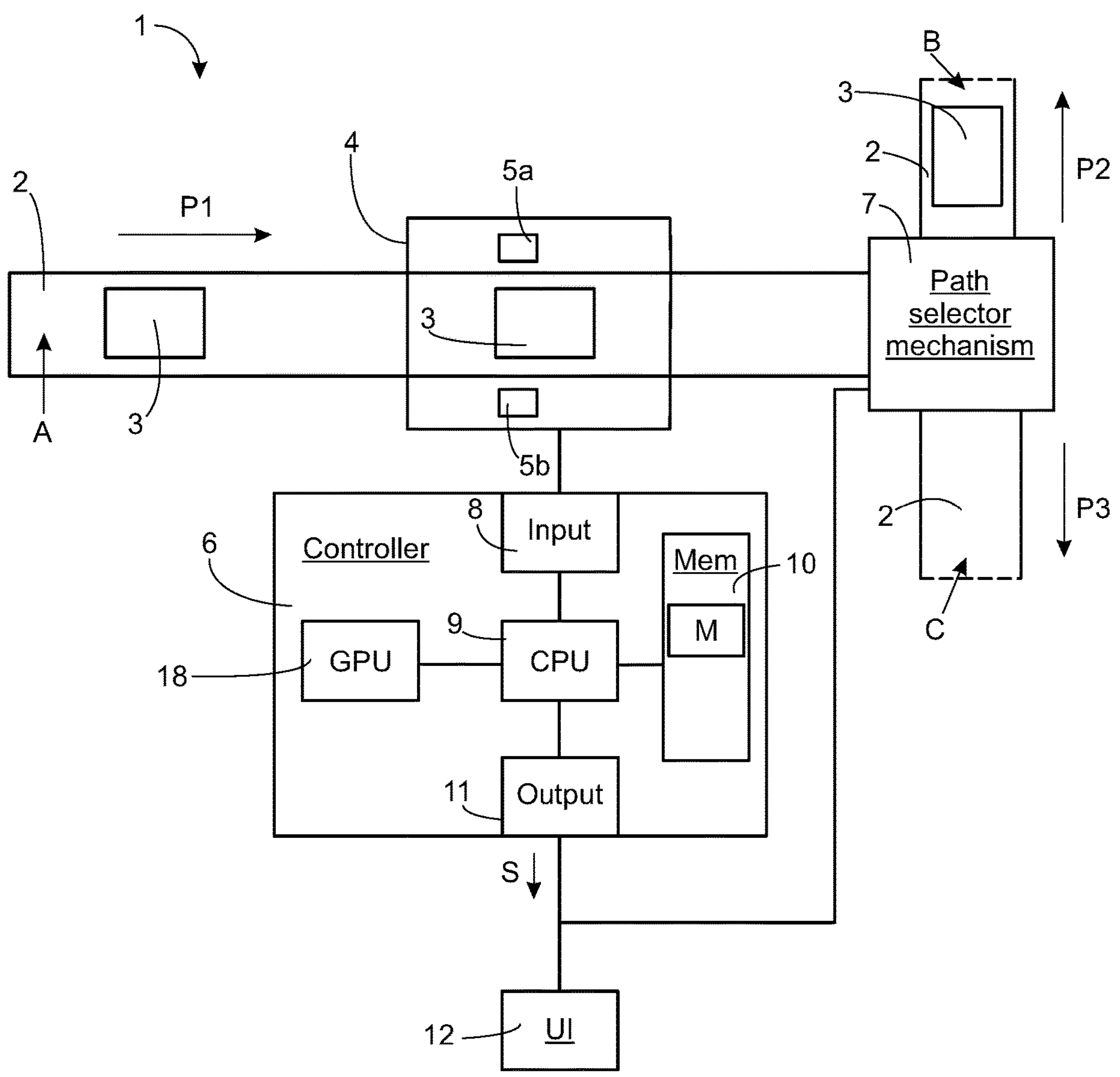
FIG. 3 shows a schematic representation of a platform sorting facility.

FIGS. 2 and 3 show representations of a platform sorting facility 1, which can be used to sort pallets 3 (or any platforms) such as those shown in FIGS. 1*a* and 1*b*. While a particular type of pallet is depicted in FIGS. 1*a* and 1*b*, it will be appreciated that methods of the present disclosure may apply to any type of pallet, such as plastic pallets, wheeled pallets (sometimes referred to as dollys) etc., and indeed any type of platform, such as containers. The platform sorting facility 1 is configured to sort pallets by detecting one or more properties of the pallets and determine for each pallet a location to which the pallet is to be directed. The platform sorting system 1 comprises a conveyor means 2, a platform recognition apparatus 4, and a path selector mechanism 7. FIG. 2 shows four path selector mechanism 7*a*-7*d*, and FIG. 3 shows one path selector mechanism 7, although it will be appreciated that any number of path selector mechanisms may be present.

The conveyor means 2 is configured for transporting pallets 3 through the platform sorting facility 1. That is, unsorted pallets 17 may be placed individually, either manually or automatically, on the conveyor means 2 at an initial position, such as position A, for movement through the platform sorting facility 1 and to a desired location, such as locations B, C, D or E within the platform sorting facility 1. FIG. 2 shows example locations B, C, D, and E corresponding with the locations of specific stackers, where pallets 3 may be stacked by the stackers. FIG. 3 shows example locations B and C located at the end of paths P2 and P3. It will be appreciated that any number of locations may be used, the number dependent on the requirements of the platform sorting facility 1. The conveyor means 2 may be any suitable mechanism for transporting pallets 3. For example, the conveyor means 2 may be one or more conveyor belts which are advanced under the action of one or more motors. Alternatively, the conveyor means 2 may not be driven by a motor. For example, the conveyor means 2 may comprise a plurality of rollers arranged perpendicular to the direction of travel of the pallet 3. The rollers may be free to rotate such that a pallet 3 may be pushed or pulled along the rollers to advance the pallet 3 through the platform sorting facility 1. In other examples, the rollers may be configured to rotate under the action of a motor or other suitable source of torque in order to advance the pallet 3. Of course, the conveyor means 2 may comprise a combination of both driven and non-driven conveyor sections. The conveyor means 2 may comprise one or more autonomous agents, such as automated guided vehicles configured to move pallets from one location to another. In some cases, there may be no conveyor means 2. For example, pallets may be manually moved between locations.

The platform recognition apparatus 4 is configured to determine one or more properties of a pallet 3 (or platform). The platform recognition apparatus 4 comprises one or more electromagnetic sensors 5*a*, 5*b* and a controller unit 6, where the controller unit 6 is coupled to the one or more electromagnetic sensors 5*a*, 5*b* (see FIG. 3). In an embodiment, the electromagnetic sensors 5*a*, 5*b* are cameras. The cameras 5*a*, 5*b* may be colour area scan cameras, although it will be appreciated that other cameras may be used. The one or more cameras 5*a*, 5*b* are configured to image portions of a pallet 3. In an example, the cameras 5*a*, 5*b* are configured to image portions of a pallet 3 as the pallet 3 passes through the platform recognition apparatus 4 while traveling along path P1.

Figure 4A:
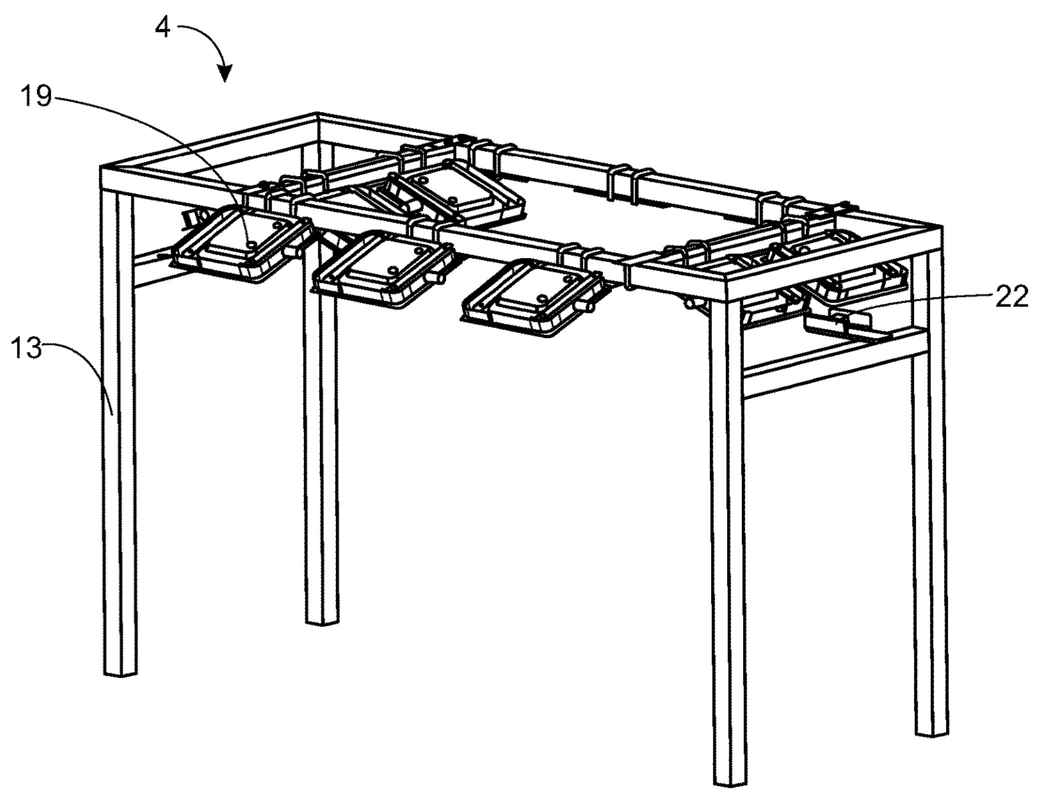
FIG. 4*a* shows a perspective view of a platform recognition apparatus.
Figure 4B:
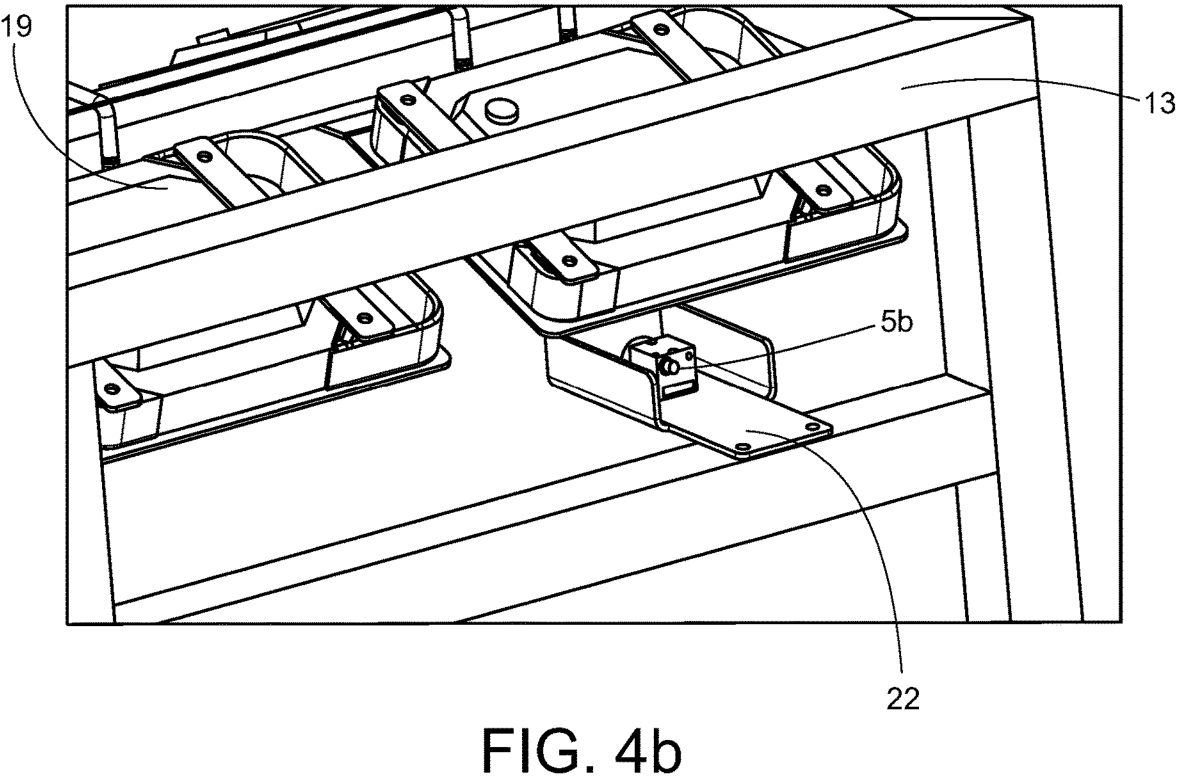
FIG. 4*b* shows an enlarged view of the platform recognition apparatus.
Figure 4C:
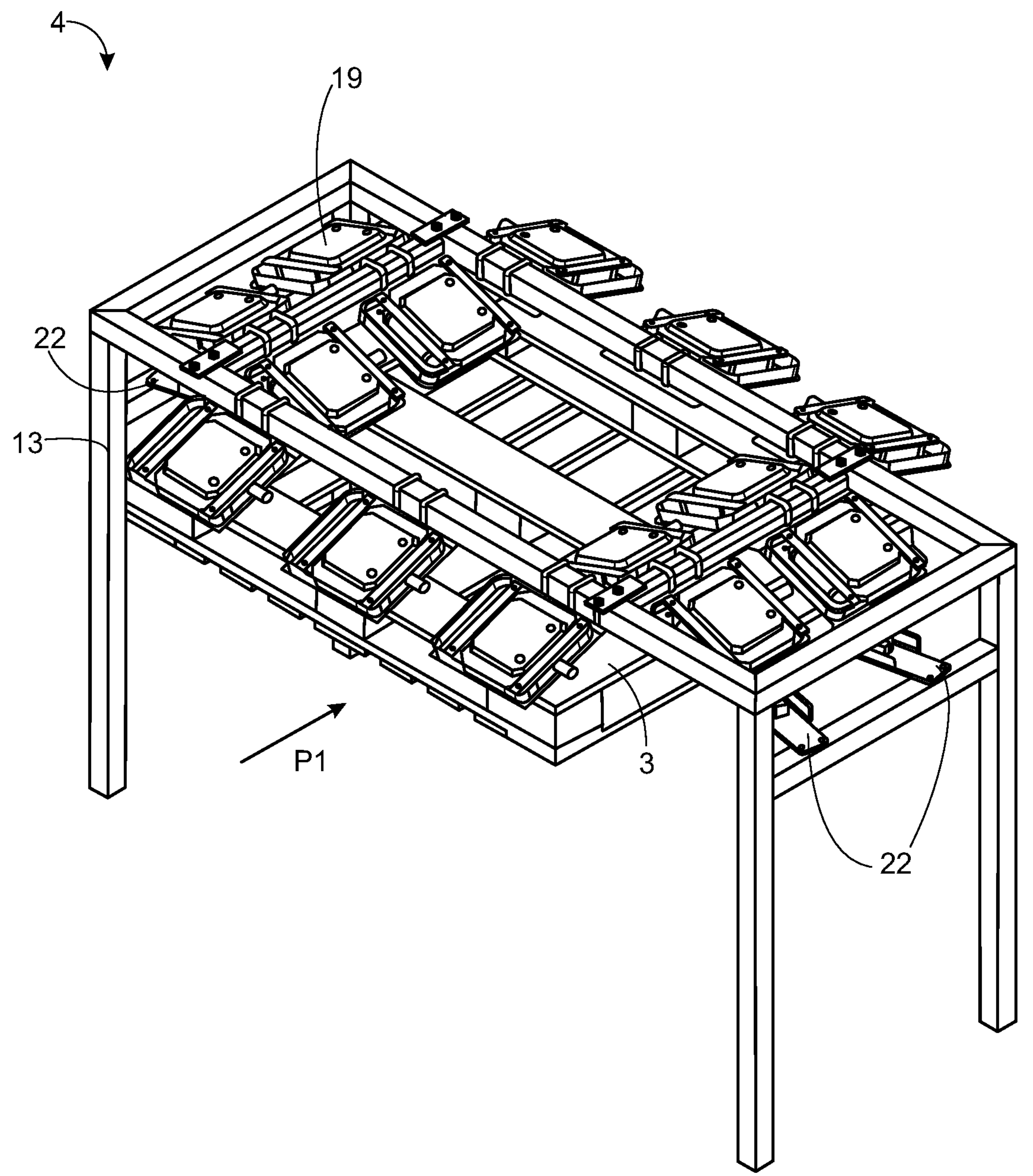
FIG. 4*c* shows a perspective view of a platform recognition apparatus during use.

In the example shown in FIG. 3, there are two cameras 5*a*, 5*b*. However, it will be appreciated that there may be any suitable number of cameras. The cameras 5*a*, 5*b* may be arranged on a structure 13 (shown in FIGS. 4*a*, 4*b* and 4*c*) of the platform recognition apparatus 4. For example, the structure 13 may extend over the conveyor means 2, such that the pallet 3 may be said to pass through the platform recognition apparatus 4. A graphic illustration of the platform recognition apparatus 4 is shown in FIG. 4*a* without a pallet 3. FIG. 4*c* shows the platform recognition apparatus 4 with a pallet 3 passing through the platform recognition apparatus 4 (where elements of the conveyor means 2 are missing for clarity).

The platform recognition apparatus 4 may optionally comprise one or more lights 19 (not all lights are labelled in the figures for clarity). The lights 19 may be attached to the structure 13. The lights 19 may provide light such that a clear image may be captured by the cameras 5*a*, 5*b*. The cameras 5*a*, 5*b* may be located in any suitable position on the structure 13 such that they can image the pallet. The cameras 5*a*, 5*b* may be arranged to capture images of either side of the pallet 3 as the pallet 3 passes through the platform recognition apparatus 4, where each side of the pallet 3 corresponds to a side generally parallel with the direction of travel though the platform recognition apparatus 4. However, it will be appreciated that the cameras 5*a*, 5*b* may be arranged to capture any suitable angle of the pallet 3, such as the top, bottom, front or back of the pallet. In the example shown, the cameras 5*a*, 5*b* are arranged at a similar height to the pallet 3 as the pallet 3 passes through the platform recognition apparatus 4 so as to capture images of one or more sides of the pallet 3. The cameras 5*a*, 5*b* may be connected to the structure 13 using any suitable means. In the example shown in FIG. 4*a*, the cameras 5*a*, 5*b* are fixed on mounts 22, where the mounts are fixed to the structure 13. The example shown in FIG. 4*c* has four cameras, two mounted on either side of the structure 13 (only three mounts 22 are visible).

Data output from the cameras 5*a*, 5*b* is sent to the controller 6 for processing. The controller 6 may comprise any suitable form for processing the data output by the cameras 5*a*, 5*b*. In an example, the controller 6 comprises an input module 8, a microprocessor such as a central processing unit (CPU) 9, a graphics processing unit (GPU) 18, a non-volatile memory 10 and an output module 11, connected together via a bus. While not shown, the GPU and CPU have access to volatile memory, such as a random access memory (RAM). The input module 8 is configured to receive an output, such as data comprising one or more images from the sensors 5*a*-51. The memory 10 stores an algorithm, which in an embodiment, is a machine learned model M which can be executed by the processor 9 or, in some embodiments, can be executed by the graphics processing unit 18. The machine learned model M is configured to determine one or more properties of the pallet 3 based on image data representing the pallet, where the image data may comprise the output from one or more of the cameras 5*a*, 5*b*. In an embodiment, image data representing the pallet 3 is processed by the machine learned model M and data indicating a classification of the pallet 3 is output by the model M. The image data may comprise the one or more images of the pallet 3 taken with the cameras 5*a*, 5*b*. It will be appreciated that the image data may be pre-processed prior to being input into the machine learned model M, such that the image data is in a suitable form for input into the machine learned model M.

Based on the classification of the pallet 3 output by the machine learned model M, a location (such as locations B-E) to which the pallet is to be transported may be determined. As described above, the location B-E may correspond with the locations of specific stackers. The processor 9 or GPU 18 may make said determination of location, or may output the classification to any other suitable processor, such as a separate Programmable Logic Controller (PLC) (not shown), where the determination of location may be made. Once determined, an output S comprising the data indicating the location may be output. In examples where the controller 6 makes the determination of the location, the data indicating the location is output using the output module 11. Of course, if a PLC makes the determination of the location, the output S may be output from an output module of the PLC.

The output S may be sent to one or more path selector mechanisms 7, or may be sent to a user interface 12 such as a monitor, or both. The output S may comprise a control signal that causes, for example, a specific path selector mechanism 7 to actuate in order to change the path of the pallet 3 as the pallet 3 travels along the conveyor means 2. The controller 6 may determine a specific path selector mechanism 7 to send the control signal S to, such that only that specific path selector mechanism 7 changes the path of the pallet 3.

Path selector mechanisms 7 are configured to change the path a pallet 3 takes while travelling along the conveyor means 2. The path selector mechanism 7 comprises an actuator, which, when actuated causes the change in the path of the pallet 3. For example, the path selector mechanism 7 may be located at a position along the path in which the path splits. In the example shown in FIG. 2, four path selector mechanisms 7*a*-7*d* are shown. Each of these path selector mechanisms are configured such that, when actuated, each would cause the pallet 3 to divert from path P1, to a second path directed towards one of stackers at locations B-E. For example, if a first path selector mechanism 7*a* receives the control signal S, it will actuate so as to cause the pallet 3 to be diverted from path P1 to travel along path P2 to location B. If, instead, a second path selector mechanism 7*b* receives the control signal, the first path selector mechanism 7*a* will not actuated (because no control signal is sent to the first path selector mechanism 7*a*). This allows the pallet 3 to continue on path P1 past the first path selector mechanism 7*a* to reach the second path selector mechanism 7*b* and subsequently be diverted to location C.

FIG. 3 shows an alternative arrangement of the path selector mechanism 7, where path P1 splits into path P2 and path P3. Path P2 leads towards location B and path P3 leads towards location C. Location B and location C may lead to areas in which similar pallets may be grouped or stacked, or may lead to further locations in which the path splits. It will be appreciated that further platform recognition apparatus and/or path selector mechanisms may be located at any one of location B or C if required. It will be appreciated that in examples where no path selector mechanism is present, a user may manually place the pallet on either path P2 or path P3, based on an output from the user interface 12. For example, if the user interface 12 outputs that a particular pallet 3 is to be sent to location B, the user may manually put the pallet on path 2, or may put the pallet in location B, using for example, a forklift truck.

In some examples where the output S from the controller 6 is sent to a path selector mechanism 7, the path selector mechanism 7 may use the output S to select a path. For example, with reference to FIG. 2, the pallet 3 may have been classified as being a CHEP pallet by the machine learned model M. Location B may be a location in which CHEP pallets are to be stacked. The controller 6 (or another PLC) may output the control signal S directly to the path selector mechanism 7*a* to cause the pallet 3 to travel along path P2 towards location B.

The path selector mechanism 7 may comprise any suitable hardware in order to select or change a path. For example, the path selector mechanism 7 may comprise one or more processors, memory, i/o interfaces, along with any actuator or combination of actuators that would cause a platform to be directed along a specific path (such as P2 or P3 in FIG. 3). Such actuators are well known, and examples of which may comprise mechanical arms, or moveable surfaces or guides that move under the action of motors, hydraulics, and/or pneumatic systems etc. in order that a force is applied to the pallet such that the pallet undergoes a change in direction. The path selector mechanism 7 may in some implementations be integrated into the conveyor means 2.

As described above, the decision as to where to send a pallet 3 is based on the outcome of the machine learned model M. In an embodiment, the machine learned model M comprises a neural network. In an embodiment, the machine learned model M comprises a convolutional neural network. The machine learned model M is configured to determine a property of the pallet 3. In an embodiment, the machine learned model M is trained to classify the pallet 3 (e.g. the property is a classification). For example, the machine learned model M may classify pallets as being of a particular make, type, size or colour. In other words, the machine learned model M classifies images of a pallet as belonging to a category of a plurality of trained categories. The machine learned model M takes as an input image data representing the pallet 3. In an embodiment, the image data comprises one or more images of the pallet 3 captured by the cameras 5*a*, 5*b*. Of course, it will be appreciated that the image data may comprise one or more images of the pallet captured by only one of the cameras 5*a*, 5*b*. While other machine learned models may be used, it has been found by the inventors that a convolutional neural network is particularly suited to the present task.

Figure 5:
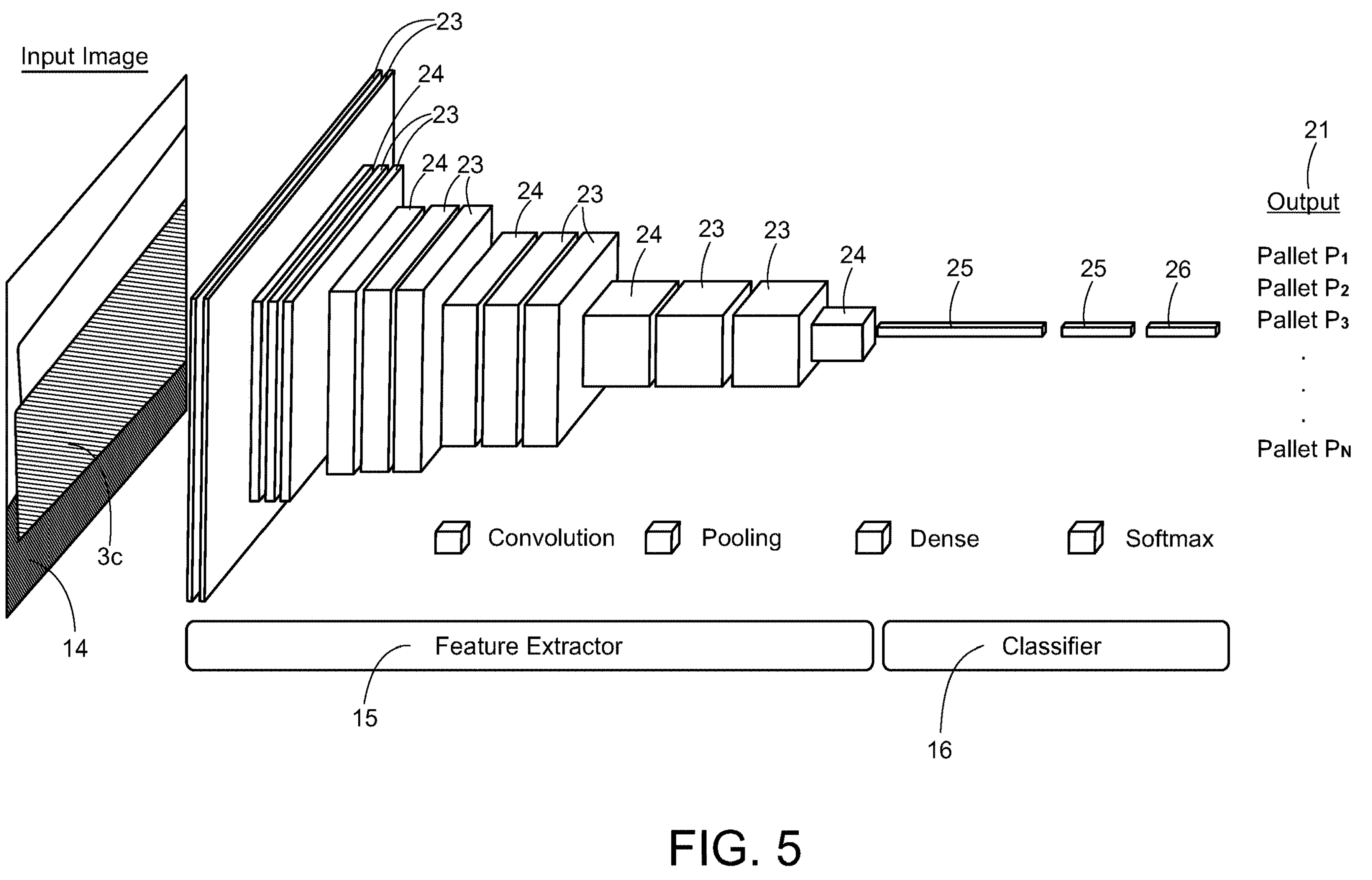
FIG. 5 shows a schematic view of a machine learned model.

An example of the machine learned model M is shown in FIG. 5. An input image 14 which comprises image data representing a pallet 3 is input into the machined learned model M. In this particular example, the input image shows a block 3*c* of the pallet 3. The model M comprises, in the specific example shown, a feature extractor portion 15 having multiple convolutional layers 23 and pooling layers 24, and a classifier portion 16 comprising of several fully connected layers (dense layers 25) and softmax output layer 26. In the example shown, there are a pair of convolutional layers 23 prior to each pooling layer 24. It will of course be appreciated that this need not be the case. For example, a single convolutional layer 23 (or more than two convolutional layers 23) may be used prior to each pooling layer 24. Additionally, it will be appreciated that the structure of the model M (e.g. number of each layer) may change dependent on the specific requirements of the model M. In the example shown, two dense layers 25 are present, however, any number of dense layers may be used, such as one. Multiple dense layers may be used to reduce the dimensions of the data output from the final pooling layer.

An output 21 of the model M may be, for each category, a score (e.g. between 0 and 1) which represents a likelihood that a platform represented in the image data belongs to a particular category. In the example shown in FIG. 5, the categories for output 21 comprise PalletP1, PalletP2, PalletP3, . . . , PalletPN. Each category may correspond to a manufacturers of pallets, e.g. the output where PalletP1 may be a CHEP pallet, and PalletP2, . . . , PalletPN may be pallets not manufactured by CHEP. In other examples, PalletP1 may correspond with a particular model of CHEP pallet, such as B4840A, and PalletP2 may correspond with a different model of CHEP pallet, such as B1210A, with PalletP3 to PalletPN corresponding to different models of other pallets manufactured by other manufacturers. Of course, it will be appreciated that other outputs may be used for different classification tasks, e.g. colours, sizes, material etc. In an embodiment, the machine learned model M is configured to be executed on the GPU 18. It has been found by the inventors that executing the model M on a GPU performs significantly quicker than on a CPU.

The machine learned model M may be trained in any suitable way. As an example, the machine learned model M is trained on training data comprising labelled platform images, such as labelled pallet images. The labelled pallet images comprise images of pallets, along with labels specifying a category of the pallet image. For example, the pallet image may be of a pallet owned by CHEP, and the label may indicate that the image is of a pallet owned by CHEP. In this way, the machine learned model M learns features of the different pallets in order to distinguishing between the different pallets. Of course, if the platforms to be recognised and sorted are dollys or containers, then the training data will comprise labelled images of dollys or containers. Training the machine learned model M may comprise minimising a cost function using back propagation with gradient descent. For example, the training images may be input into the model M where an output is generated. A cost can be calculated based on a given output, and backward propagation can be used in order to adjust weights of the network to minimise the cost function.

Figure 6:
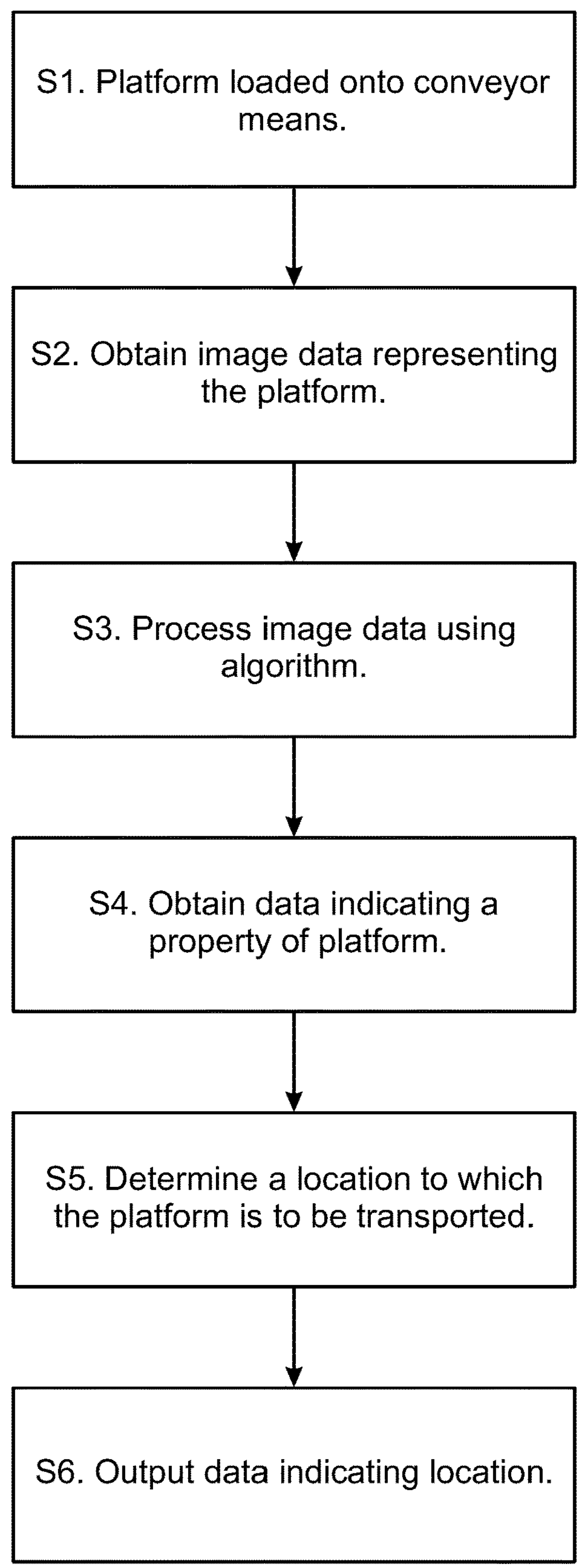
FIG. 6 shows a flow diagram of a method disclosed herein.

The training data may be built by capturing images of a number of different pallets (or portions of pallets) as the pallets pass through the platform recognition apparatus 4 (or an apparatus having a similar arrangement of cameras 5*a*, 5*b* to the platform recognition apparatus). In this way, the form of the training data (e.g. orientation of cameras with respect to pallets, lighting, etc.) may generally match the live data obtained during use (e.g. when sorting pallets in the platform sorting facility 1), leading to more accurate classification. In a specific example, the training data is captured by one or both of the two cameras 5*a*, 5*b*, of the platform recognition apparatus 4. With reference to FIG. 6, there is described a method according to the present disclosure.

At step S1, a platform 3 (such as a pallet as described above) is loaded onto the conveyor means 2, at for example location A, and advanced along path P1. The platform 3 may be loaded onto the conveyor means 2 using any known method.

At step S2, image data representing the platform 3 is obtained. For example, the platform 3 advances through the platform recognition apparatus 4 and one or more cameras 5*a*, 5*b* capture images of the platform 3. The images may be colour images. The cameras 5 may be triggered to start capture when the platform 3 reaches a certain point along path P1. For example, a trigger may be arranged such that the cameras 5*a*, 5*b* begin capturing images or video of the platform such that certain portions of the platform 3 are captured. In an example, the trigger may be arranged such that a leading edge of the platform 3 is captured, where the leading edge is a leading edge relative to the direction of travel along path P1. However, it will be appreciated that such a trigger is not necessary in every embodiment, or the trigger point may vary. The cameras 5*a*, 5*b* may capture images in any suitable arrangement. For example, the cameras may capture a set number of frames of video, each frame comprising an image. The cameras 5*a*, 5*b* may be arranged to capture only a portion of the platform, or, for example may be arranged to capture the entire side view of the platform.

At step S3, the image data is processed using an algorithm, such as the machine learned model M described above, to determine a property of the platform based on one or more features of the platform. The property of the platform may be a classification of the platform. The one or more features of the platform may be learned features of the platform, such as the colour, shape, size, material, etc of the platform.

Batch processing may be used. For example, the image data processed by the machine learned model M may comprise data relating to a batch of images. For example, image data comprising multiple images may be processed by the machine learned model M, and a platform classification may be determined based on an accumulated classification. An example of this would be if the image data comprised data relating to 25 images, and where 22 of these images are classified as PalletP1 and 3 of the images are classified as PalletP3, the determination may be that the pallet 3 is classified as PalletP1. In this case, the majority output was used to determine that the classification is PalletP1. Alternatively, a threshold may be used in order to determine the final classification. The threshold may be any suitable threshold, such as a certain percentage of the images being classified as a particular pallet type. In other examples, only one image need be processed. In other examples, batch processing need not be used. For example, image data comprising a single image may be processed to determine a property of the platform 3.

At step S4, data indicating a property of the platform is obtained from the algorithm, such as the machine learned model M. The property may be a classification of the platform. That is, the model M may output data which indicates a classification of the platform 3. For example, the classification may be that the platform is a platform manufactured by CHEP, or another manufacturer, or may be a classification of a particular model of platform.

At step S5, a determination is made of a location to which the platform 3 is to be transported. For example, the controller 6 (or another controller, such has a PLC) may determine the location based on the platform classification output by the model M. For example, stackers are typically configured to stack specific platform type or types. When the platform 3 is recognized as being a particular type, this information is used to determine the location to send the platform 3. The location may be the location of a stacker for the recognised platform type. Any suitable method may be used to determine the location. For example, the output provided by the machine learned model M may be compared to a database listing one or more classifications of platforms and their respective destinations or the specific path selector mechanism or actuator that needs to be actuated such that the platform would be guided to the destination. In another example, the data output by the model M may itself indicate the location.

At step S6, data indicating the location, such as, for example, locations B, C, D or E, is output. The data indicating the location may take any suitable form. For example, the data indicating the location may comprise a control signal as described above. The control signal S may be sent to a path selector mechanism 7, where the path selector mechanism 7 is configured to, on receipt of the control signal S, automatically change the path of the platform 3 to guide the platform towards the location. A specific path selector mechanism 7 may be identified and the control signal S sent to that identified path selector mechanism 7. For example, a platform 3 may have been classified as being a CHEP platform by the machine learned model M. Location B may be a location in which CHEP platforms are to be stacked. The controller 6 (or another PLC) may output the control signal S directly to the path selector mechanism 7*a* (which operates at a junction between path 1 and path 2) to cause an actuator of the path selector mechanism 7*a* to actuate and thereby cause the platform 3 to travel along path P2 towards location B. In this way, the platforms 3 may be sorted into their respective groupings.

Alternatively or additionally, the output S is sent to the user interface 12 to be, for example, displayed on a display. In some cases, a user at the user interface 12 can, based on the output S, change the path of the platform 3. For example, a user may move the platform 3 to a location indicated on the display of the user interface, or may move the platform to a position of the conveyor means 2 which directs the platform 3 to the indicated location.

While various embodiments have been described herein, it will be appreciated that this description is in all respects illustrative, not restrictive. Various modifications will be apparent to the skilled person without departing from the spirit and scope of the invention.

The controller unit 6 may take any suitable form. For example, while only one processor, input module, output module, GPU and memory are described, the controller unit 6 may of course have multiple such components, e.g. multiple processors, or may not have some components, such as the GPU. Furthermore, while separate inputs and outputs have been described, these may be combined where appropriate. The controller unit 6, or components of the controller unit 6, may be geographically distributed remote from other components of the platform sorting facility 1.

That is, the control unit 6 may be located on a remote computer such as a remote server, e.g. in the cloud. Parts of the method may be carried out on one or more edge devices or loT devices. In some implementations, smart cameras may be used, where the controller 6 is embedded within the smart camera. The smart camera may be able to capture the images of the platform 3 and execute the machine learning model M at a processor of the camera. The output from the camera may then comprise the output from the machine learned model M, or even the data indicating the location to which the platform is to be sent. In some cases, the smart camera may output the control signal to the path selector mechanism.

The user interface 12 may comprise any suitable user interface, such as a monitor connected to a PC, laptop, tablet, mobile phone, speaker, etc., It will be appreciated that the machine learned model M may be stored in any suitable location. For example, while it has been described that the machine learned model M is stored at a memory 10 of the controller 6, the machine learned model M may be stored elsewhere, such as in the cloud. In such cases, the platform recognition apparatus 4 may have an interface for obtaining the machine learned model, such as a network controller.

While the machine learned model M has been described as a convolutional neural network, which has been found to offer robust recognition of platforms, other models may be used. For example, algorithms such as Support Vector Machines, Decision Trees or Random Forest may be used, where, for example, image features like colour information are used to classify platforms. In some cases the algorithm may be a non-machine learned model. For example, if the platforms are distinctive enough such that a specific marker (such as colour information) is enough to differentiate between the platforms, then an image processing algorithm could be used to recognise different platforms without the need to train a model.

While it has been described that the pallet 3 passes through the platform recognition apparatus 4, it will be appreciated that the pallet need not pass "through" the platform recognition apparatus. That is, the pallet 3 may simply pass by one or more cameras 5*a*, 5*b*, said cameras mounted to any suitable structure such that the cameras 5*a*, 5*b* may image the pallet 3.

While certain aspects have been described with respect to pallets, it will be appreciated that these aspects also apply to any platforms, such as dollys or containers.

The invention claimed is:

1. A method for transporting platforms through a platform sorting facility, the method comprising:
- receiving a first platform at an initial position on a conveyor means;
- performing the following steps in respect of the first platform:
  - a) obtaining image data representing the first platform;
  - b) processing the image data using an algorithm, the algorithm configured to determine at least one property of the first platform based on one or more features of the first platform, wherein the one or more features of the first platform comprise at least one between a make, a size, a shape, a material, or a color of the first platform;
  - c) obtaining, from the algorithm, data indicating the at least one property of the first platform;
  - d) determining, based on the data indicating the at least one property of the first platform, a single location, selected from a plurality of locations, to which the first platform is to be transported, wherein:
    - (i.) each of the plurality of locations corresponds to the location of a stacker in the platform sorting facility,
    - (ii.) each stacker is associated with a different at least one of the make, the size, the shape, the material, or the color of platforms to be received by the stacker, and
    - (iii.) the single location is the location of a stacker in which the first platform is to be stacked; and
  - e) transporting, using the conveyor means, the first platform to the determined location to which the first platform is to be transported;
- receiving a second platform at the initial position on the conveyor means; and
- repeating steps a) to e) in respect of the second platform, wherein the first and second platforms each comprise a pallet or dolly.

2. The method of claim 1, wherein said transporting comprises:
- outputting data indicative of the determined location.

3. The method of claim 2, wherein outputting the data indicative of the determined location comprises:
- outputting a control signal to an actuator; and
- actuating the actuator, based on the control signal, so as to cause the first platform to be transported towards the determined location.

4. The method of claim 3, further comprising selecting, based on the determined location, the actuator from a plurality of actuators.

5. The method of claim 3, wherein the transporting further comprises:
- advancing the first platform, using the conveyor means, along a first path from the initial position, wherein actuating the actuator causes the first platform to advance along a second path towards the determined location.

6. The method of claim 1, further comprising:
- capturing, using one or more cameras, one or more images of the first platform; and
- obtaining the image data representing the first platform from the one or more images of the first platform.

7. The method of claim 1, wherein the algorithm comprises a machine learned model trained to classify the one or more features of the respective platform; and wherein the data indicating the property of the first platform comprises data indicating a classification of the first platform.

8. The method of claim 7, wherein the machine learned model is trained using image data captured from one or more cameras.

9. The method of claim 7, wherein the algorithm comprises a neural network.

10. The method of claim 1, wherein the second platform is transported to a different location than the first platform.

11. The method of claim 1, wherein the stacker in the platform sorting facility is configured to receive a stack of platforms.

12. A system for transporting platforms through a platform sorting facility, the system comprising:
- a conveyor means;
- one or more processors; and
- a memory storing an algorithm, the algorithm, which when executed by the one or more processors, is configured to determine at least one property of a platform based on one or more features of the platform, wherein the one or more features of the platform comprise at least one between a make, a size, a shape, a material, or a color of the platform;

wherein the system is configured to:

receive a first platform at an initial position on the conveyor means;

perform the following steps in respect of the first platform:

a) obtain image data representing the first platform, b) process the image data using the algorithm, c) obtain, from the algorithm, data indicating the at least one property of the first platform, d) determine a single location to which the first platform is to be transported based on the data indicating the at least one property of the first platform, the single location being selected from a plurality of locations, wherein:

(i.) each of the plurality of locations corresponds to the location of a stacker in the platform sorting facility, (ii.) each stacker is associated with a different at least one of the make, the size, the shape, the material, or the color of platforms to be received by the stacker, and (iii.) the single location is the location of a stacker in which the first platform is to be stacked; and e) transport, using the conveyor means, the first platform to the single location to which the first platform is to be transported;

receive a second platform at the initial position on the conveyor means; and repeat steps a) to e) in respect of the second platform, wherein the first and second platforms each comprise a pallet or dolly.

13. The system of claim 12, further comprising an actuator, wherein:

the one or more processors are further configured to output data indicative of the determined location that is a control signal, the actuator is configured to receive the control signal, and further configured to actuate, based on the control signal, so as to cause the first platform to be transported towards the determined location, and the conveyor means is configured to advance the first platform along a first path from the initial position, wherein actuating the actuator causes the first platform to advance along a second path towards the determined location.

14. The system of claim 12, further comprising:

one or more cameras, the one or more cameras configured to capture one or more images of the first platform;

wherein the one or more processors are further configured to obtain the image data representing the first platform from the one or more images of the platform.

15. The system of claim 12, wherein the stacker in the platform sorting facility is configured to receive a stack of platforms.

16. A method for transporting platforms through a platform sorting facility, the method comprising:

receiving a first platform at an initial position on a conveyor means;

performing the following steps in respect of the first platform:

a) obtaining image data representing the first platform;

b) processing the image data using an algorithm, the algorithm configured to determine at least one property of the first platform, the at least one property being at least one of:

(i.) whether the first platform is plastic or wood, (ii.) whether the first platform is wheeled or non-wheeled, (iii.) whether the first platform is a half pallet or a full pallet, (iv.) a color of the pallet, or (iv.) an owner of the pallet, c) obtaining, from the algorithm, data indicating the at least one property of the first platform;

d) determining, based on the data indicating the at least one property of the first platform, a single location, selected from a plurality of locations, to which the first platform is to be transported, wherein:

(i.) each of the plurality of locations corresponds to the location of a stacker in the platform sorting facility, (ii.) each stacker is associated with at least one of: plastic platforms, wood platforms, wheeled platforms, non-wheeled platforms, half pallets, full pallets, a color of the platforms, or a specific owner of the platforms to be stacked on the respective stacker, and (iii.) the single location is the location of a stacker in which the first platform is to be stacked; and e) transporting, using the conveyor means, the first platform to the determined location to which the first platform is to be transported;

receiving a second platform at the initial position on the conveyor means; and repeating steps a) to e) in respect of the second platform, wherein the first and second platforms each comprise a pallet or dolly.

17. The method of claim 16, wherein:

the at least one property of the first platform and the second platform is whether the platform is wheeled or non-wheeled, the first platform is a non-wheeled pallet and is transported to a stacker that is associated with non-wheeled pallets, and the second platform is a wheeled pallet and is transported to a stacker that is associated with wheeled pallets.

18. The method of claim 16, wherein:

the at least one property of the first platform and the second platform is whether the platform is plastic or wood, the first platform is a wood pallet and is transported to a stacker that is associated with wood pallets, and the second platform is a plastic pallet and is transported to a stacker that is associated with plastic pallets.

* * * * *